United States Patent
Wang et al.

(10) Patent No.: US 9,599,460 B2
(45) Date of Patent: Mar. 21, 2017

(54) HYBRID RAMAN AND BRILLOUIN SCATTERING IN FEW-MODE FIBERS

(71) Applicant: NEC Laboratories America, Inc., Princeton, NJ (US)

(72) Inventors: Ting Wang, West Windsor, NJ (US); Yi Weng, Lafayette, LA (US)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/842,503

(22) Filed: Sep. 1, 2015

(65) Prior Publication Data

US 2016/0109222 A1    Apr. 21, 2016

Related U.S. Application Data

(60) Provisional application No. 62/064,514, filed on Oct. 16, 2014.

(51) Int. Cl.
*G01B 11/16* (2006.01)
*G01L 1/24* (2006.01)

(52) U.S. Cl.
CPC ............ *G01B 11/168* (2013.01); *G01L 1/242* (2013.01); *G01L 1/246* (2013.01)

(58) Field of Classification Search
CPC ...................................... G01B 11/168
See application file for complete search history.

(56) References Cited

U.S. PATENT DOCUMENTS

| | | | | |
|---|---|---|---|---|
| 4,958,929 A * | 9/1990 | Kondo | ............... | G01B 9/02019 356/487 |
| 6,237,421 B1 * | 5/2001 | Li | ............... | G01L 1/242 73/800 |
| 7,529,434 B2 | 5/2009 | Taverner et al. | | |
| 2007/0041020 A1 * | 2/2007 | Hall | ............... | G01H 9/004 356/484 |
| 2009/0097015 A1 * | 4/2009 | Davies | ............... | G01K 11/32 356/73.1 |
| 2012/0274927 A1 * | 11/2012 | Li | ............... | G01L 1/246 356/73.1 |
| 2013/0020486 A1 * | 1/2013 | Zhang | ............... | G01B 11/16 250/349 |

(Continued)

OTHER PUBLICATIONS

H. H. Kee et al., "All-fiber system for simultaneous interrogation of distributed strain and temperature sensing by spontaneous Brillouin scattering," Optical Letters, May 15, 2000, pp. 695-697, vol. 25, No. 10.

(Continued)

*Primary Examiner* — Tarifur Chowdhury
*Assistant Examiner* — Omar Nixon
(74) *Attorney, Agent, or Firm* — Joseph Kolodka

(57) ABSTRACT

Methods and systems of sensing conditions in a fiber includes launching a light beam into a fiber. A first branch of scattered light is set to a mode other than a fundamental mode. A second branch of scattered light is optically filtered to remove unscattered input light. Brillouin scattered light is coherently detected on the first branch to produce a combined temperature/strain profile of the fiber. Raman scattered light on the second branch is directly detected to produce a temperature profile of the fiber. A strain profile of the fiber is determined, using a processor, based on the combined temperature/strain profile and the temperature profile.

16 Claims, 4 Drawing Sheets

(56) References Cited

U.S. PATENT DOCUMENTS

2013/0216176 A1* 8/2013 Li .................. G01K 11/32
 385/12
2013/0229649 A1* 9/2013 Li .................. G01M 5/0091
 356/73.1
2014/0042306 A1 2/2014 Hoover et al.

OTHER PUBLICATIONS

K. Y. Song et al., "Distributed strain measurement with millimeter-order spatial resolution based on Brillouin optical correlation domain analysis," Optical Letters, Sep. 1, 2006, pp. 2526-2528, vol. 31, No. 17.
M. N. Alahbabi et al., "Simultaneous temperature and strain measurement with combined spontaneous Raman and Brillouin scattering," Optical Letters, Jun. 1, 2005, pp. 1276-1278, vol. 30, Issue 11.
W. Zou et al., "Complete discrimination of strain and temperature using Brillouin frequency shift and birefringence in a polarization-maintaining fiber," Optical Express, Feb. 2, 2009, pp. 1248-1255, vol. 17, No. 3.

* cited by examiner

HYBRID RAMAN AND BRILLOUIN SCATTERING IN FEW-MODE FIBERS

RELATED APPLICATION INFORMATION

This application claims priority to provisional application 62/064,514, filed Oct. 16, 2014, the contents thereof being incorporated herein by reference.

BACKGROUND OF THE INVENTION

Distributed fiber-optic sensing uses properties of optical fibers to make measurements of, e.g., spatial and temporal behavior of a measurand field. Optical fibers are flexible, dielectric, passive, non-intrusive, and easy to install into existing structures. Distributed temperature sensing (DTS) technologies have been deployed in industries such as oil and gas production, power cable monitoring, leakage detection at dikes and dams, and integrity of liquid natural gas carriers. Temperatures are recorded, not at points, but as a continuous profile along the length of the optical fibers functioning as linear sensors, based on optical phonon interaction with relatively large frequency shifts (~13 THz) called Raman scattering and acoustic phonon interaction relatively small frequency shifts (~11 GHz) called Brillouin scattering.

Nevertheless, these two fully distributed fiber-optic scattering sensing schemes are limited in terms of what physical quantities they can measure. In addition to temperature sensing, strain monitoring also plays a significant role in operational safety for a variety of applications such as well integrity monitoring and downhole seismic acquisition. Strain, however, is difficult to measure, as it may not be constant across the length of the liber and may change with time before or after installation. In addition, strain may be related to temperature changes. While fiber Bragg gratings can be used as direct sensing elements for strain and temperature, they are point sensors and can only make measurements at a finite number of points along a line.

Existing Raman-based DTS systems use light intensity measurements of Raman scattered light to provide temperature determinations, which are not dependent on the strain condition of the fiber. As such, the Raman signal is sensitive to temperature only. Brillouin sensing, meanwhile, is receptive to both temperature and strain. Thus, because strain cannot be measured with Raman scattering alone, distributed strain-and-temperature sensors in a single-mode fiber use Brillouin scattering measurements alone or use a hybrid of Raman and Brillouin scattering detection in association with optical time domain reflectometry (TDR). In systems based on spontaneous Brillouin scattering, strain and temperature changes in the same single-mode sensing fiber can be distinguished by simultaneous detection of both spontaneous Brillouin intensity and Brillouin frequency shift. However, its performance is significantly limited by the poor accuracy of the intensity measurement. Other approaches use large effect area fiber to achieve simultaneous temperature and strain sensing, which creates multiple Brillouin frequency shifts within a single fiber core. This approach however leads to poor spatial resolution, limited sensing accuracy, and short sensing distance due to large interference between different wavelengths.

In hybrid schemes, the temperature profile along the sensing fiber is directly obtained by measuring a spontaneous anti-Stokes Raman signal, which is strain independent. With knowledge of the temperature of the fiber, one can then compute the strain from the Brillouin frequency shift information. This approach is limited, however, because the backscatter power levels between Raman and Brillouin are significantly different. For example, spontaneous Raman scattering measurement uses pump levels of, e.g., about 1W, while spontaneous Brillouin scattering needs narrow-band optical sources with a typical output power of below about 60 mW.

High input powers close to 1W can cause strong non-linear effects, such as modulation instability, on the Brillouin signal. If the input power goes down to 50 mW, which may occur due to fiber degradation and differential loss, then Brillouin-based DTS may continue to function, but without the Raman scattering signal there would be no way for that system to differentiate between temperature and strain effects. As such, the power requirements imposed by the Brillouin measurements do not seem compatible with the high-power optical sources needed for Raman measurements, such that measurements are made in alternation. In addition, direct detection is generally used to spatially resolve the Raman anti-stokes intensity, while coherent detection is used to spatially resolve Brillouin frequency shifts. Thus, hybrid Raman-Brillouin sensing in a single-mode fiber is analogous to monitoring two physical measurands using two distinct fiber-optic sensing systems, resulting in slow operation and high installation costs.

BRIEF SUMMARY OF THE INVENTION

A hybrid Brillouin/Raman sensor includes a mode converter configured to convert Brillouin backscattered light from a fiber to a mode other than a fundamental mode. An optical filter is configured to separate Raman forward-scattered light from a fiber to remove unscattered input light. A Brillouin receiver is configured to coherently detect the Brillouin backscattered light output by the mode converter and to produce a combined temperature/strain profile of the fiber. A Raman receiver is configured to directly detect the Raman forward-scattered light output by the optical filter and to produce a temperature profile of the fiber. A processor is configured to determine a strain profile of the fiber based on the combined temperature/strain profile and the temperature profile.

A hybrid Brillouin/Raman sensor includes a coupler configured to split backscattered light from a fiber into two paths. A mode converter is configured to convert backscattered light on a first path to a mode other than a fundamental mode. An optical filter is configured to separate backscattered light on a second path to remove unscattered input light. A Brillouin receiver is configured to coherently detect the Brillouin backscattered light output by the mode converter and to produce a combined temperature/strain profile of the fiber. A Raman receiver is configured to directly detect the Raman forward-scattered light output by the optical filter and to produce a temperature profile of the fiber. A processor is configured to determine a strain profile of the fiber based on the combined temperature/strain profile and the temperature profile.

A method for sensing conditions in a fiber includes launching a light beam into a fiber. A first branch of scattered light is set to a mode other than a fundamental mode. A second branch of scattered light is optically filtered to remove unscattered input light. Brillouin scattered light is coherently detected on the first branch to produce a combined temperature/strain profile of the fiber. Raman scattered light on the second branch is directly detected to produce a temperature profile of the fiber. A strain profile of the fiber is determined, using a processor, based on the combined temperature/strain profile and the temperature profile.

DETAILED DESCRIPTION

Embodiments of the present invention provide hybrid Raman-Brillouin sensing for highly accurate distributed strain and temperature sensing. The sensors described herein use two-mode fibers, few-mode fibers, or multi-mode fibers to make Raman and Brillouin measurements on orthogonal spatial modes and provide simultaneous temperature and strain sensing. Raman anti-Stokes intensity is measured in one mode while Brillouin frequency shift is measured in another mode, providing higher sensitivity, better resolution, and faster operation.

In one embodiment, a temperature profile is generated using a forward Raman signal in one mode and a second temperature/strain profile with backscattered Brillouin light in another mode or modes. By fitting a Lorentzian curve to each spectrum, the peak frequency is evaluated at each point along the fiber. This provides a strain profile based on the first temperature profile and further provides additional resolution on the first temperature profile based on the second strain/temperature profile from the other modes. This embodiment uses sensors at both fiber ends.

In another embodiment, backscattered anti-Stokes Raman light is measured in mode to determine a temperature while backscattered Brillouin light is measured in another mode to determine strain. This embodiment needs access to only one end of the fiber. Using multiple-input, multiple-output (MIMO) digital signal processing (DSP), a correction can be applied to each of the temperature and strain using signals from additional modes.

In each case, a two-mode fiber (TMF), few-mode fiber (FMF), or multi-mode fiber (MMF) is used instead of a single mode fiber (SMF). This provides the use of multiple parallel channels, with each independent channel being on an orthogonal spatial mode. For the present sensors, the use of such fibers provides an improvement in the ratio between the measurement range and the sensor resolution, increasing that ratio from about 500 to about 5000, thereby providing a greater dynamic range and improved sensitivity. For example, the spatial resolution of the present sensors can be as fine as about, e.g., 1m. An increase in detection speed is also provided. Compared to SMF techniques, the present sensors use two spatial modes simultaneously to measure strain and temperature, reducing the process time to about thirty seconds and making real-time sensing possible.

Accurate detection of backscattered signals and the elimination of noise are also provided. SMF sensors are not effective in reducing coherent Rayleigh noise or fading noise. FMF and MMF fibers, on the other hand, have a short coherence time and length, so any superposition will be incoherent and thus coherent Rayleigh noise will be negligible. Noise can be further reduced using frequency shift averaging.

Figure 1:
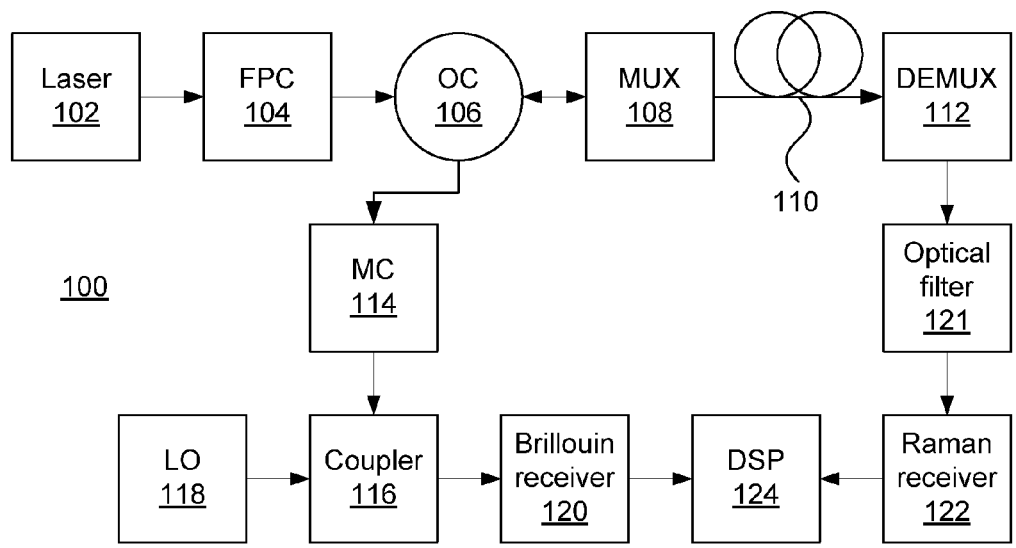
FIG. 1 is a block diagram of a hybrid Brillouin/Raman sensor in accordance with the present principles.

Referring now to FIG. 1, a hybrid Raman/Brillouin sensing system 100 is shown. In this embodiment, receivers 120/122 are positioned at both ends of a fiber 110. A laser source 102 generates a light beam or pulse. It should be noted that the laser source emits a set of mode-controlled beams. The maximum number of modes is limited by the design and beam stability of the fiber 110, with the minimum number of nodes being two. Each beampath other than the path for the fundamental mode will have a linear mode converter to change the spatial modes into higher-order modes other than $LP_{01}$, such as $LP_{11}$, $LP_{02}$, and $LP_{21}$. There are a variety of techniques that can effect mode conversion based on a linear conversion process, such as long-period fiber grating, spatial light modulators, free-space phase plates, and fused spatial mode couplers.

A spatial light modulator is an integrated spatial mode converter incorporating a liquid crystal on silicon using mode-selective phase masks fabricated in glass. It is specifically contemplated that spatial light modulators are used to control the modes of the laser source 102 due to its high efficiency and stable performance. The laser output has its polarization set by a fiber polarization controller 104, confining the laser output to a specific polarization mode. The polarized laser output passes through an optical coupler 106 and is mode multiplexed in block 108, combining all of the beams from the laser source 102 into a single beam.

The laser beam is launched into fiber 110, which may be a TMF, FMF, or MMF. While in the fiber, the laser pulse interacts with the material and experiences Raman and Brillouin scattering. Backscattered Brillouin light passes back through the multiplexer 108 and the optical coupler 106, this time going to mode controller 114 which limits the backscattered Brillouin radiation to a single mode. The mode-controlled Brillouin radiation is then coupled with light from a local oscillator 118 at a coupler 116 to be coherently received by the Brillouin receiver 120. Spontaneous Raman scattering is detected on the fundamental mode, withother modes being rejected by the mode demultiplexer 112, while spontaneous Brillouin scattering occurs on a higher-order mode, having a power level that is about 10 dB weaker after passing through the fiber 110, the coupler 116, and the mode converter 114, with other modes being rejected during demultiplexing at 108.

The Raman radiation that is scattered forward passes through a mode demultiplexer 112, which splits the constituent modes of the beam. An optical filter 121 separates light the Raman scattered light from reflected input light. In one example, the input signal from the laser 102 may have a wavelength of about 1550 nm, while the scattered Raman light may have a wavelength of about 1450 nm. The optical filter 121 filters out signals at the input wavelength so that the anti-stokes spontaneous Raman scattered light passes through. A Raman receiver 122 captures the emitted light. A digital signal processor 124 takes the output of both the Brillouin receiver 120 and the Raman receiver 122 and uses the two outputs together to determine both a temperature and strain profile for the fiber 110.

Figure 2:
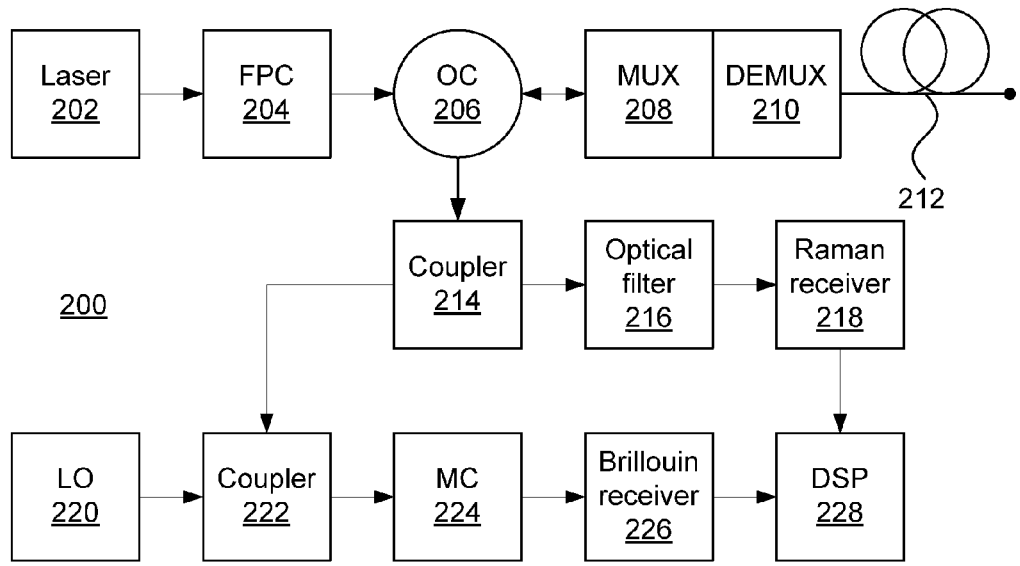
FIG. 2 is a block diagram of a hybrid Brillouin/Raman sensor in accordance with the present principles.

Referring now to FIG. 2, a hybrid Raman/Brillouin sensing system 200 is shown. In this embodiment, receivers 218/226 are positioned at only one end of the fiber 212. As in the double-ended embodiment of FIG. 1, a laser 202 generates a light beam or pulse. The laser output has its polarization set by a fiber polarization controller 204 and passes through an optical coupler 206. The beam is mode multiplexed in block 208 and is launched into the fiber 212, which may be a TMF, FMF, or MMF.

While in the fiber, the laser pulse interacts with the material and experiences Raman and Brillouin scattering. The backscattered Brillouin and Raman signals pass back through a mode demultiplexer 210 and the optical coupler 206 to reach coupler 214. The coupler 214 splits the signals into two equal branches. In the first branch, an optical filter 216 filters the signal and a Raman receiver 218 detects it. The optical filter 216 separates light the Raman scattered light from reflected input light. In one example, the input signal may have a wavelength of about 1550 nm, while the scattered Raman light may have a wavelength of about 1450 nm. The optical filter 216 filters out signals at the input wavelength so that the anti-stokes spontaneous Raman scattered light passes through. In the other branch, the signal is mixed with light from a local oscillator 220 in a coupler 222 and then limited to a single mode by mode controller 224. A Brillouin receiver 226 receives the signal. Both the Raman receiver 218 and Brillouin receiver 226 provide their outputs to digital signal processing 228, which determines a temperature and strain profile for the fiber 212. Spontaneous Raman scattering is detected on the fundamental mode, while spontaneous Brillouin scattering occurs on a higher-order mode, having a power level that is about 10 dB weaker after passing through the fiber 212, the coupler 222, and the mode converter 224.

Figure 3:
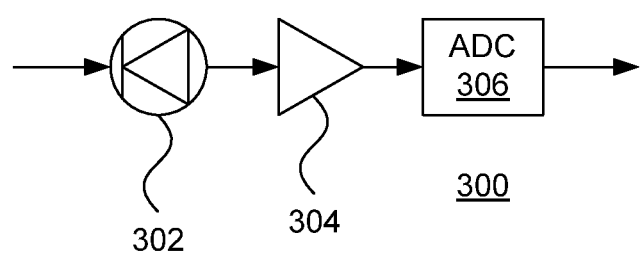
FIG. 3 is a block diagram of a Raman receiver in accordance with the present principles.

Referring now to FIG. 3, a diagram of a Raman receiver 300 is shown. After the signal is filtered to only include Raman scattered signals, an avalanche photodiode 302 collects the light and converts it to the electrical domain while a trans-impedance amplifier 304 boosts the signal. An analog-to-digital converter 306 then converts from the analog domain to the optical domain to render the signal suitable for processing.

Figure 4:
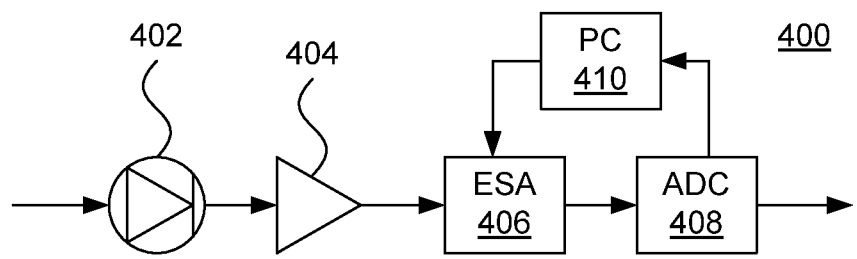
FIG. 4 is a block diagram of a Brillouin receiver in accordance with the present principles.

Referring now to FIG. 4, a diagram of a Brillouin receiver 400 is shown. The mode-controlled signal reaches a P-I-N photodiode 402, which converts the signal into the electrical domain. The photodiode 402 may have an exemplary frequency of about 12.5 GHz. The electrical signal is amplified by a trans-impedance amplifier 404 and then reaches an electrical spectrum analyzer 406. The electrical spectrum analyzer 406 produces a Brillouin scattered trace, which is converted to the digital domain by an analog-to-digital converter 408. A computer 410 also access the digital trace and provides feedback to the electrical spectrum analyzer 406. The computer 410 serves as an offline digital signal processor for forward Raman sensing. Because the temperature change along an FMF is proportional to the anti-Stokes to Stokes Raman intensity ratio (which is insensitive to strain variations), temperature values may be obtained using spontaneous Raman scattering alone. The computer 410 feeds back to the electrical spectrum analyzer with temperature data from the Raman sensing, which is then used with the Brillouin proportionality coefficient matrix to determine strain values.

Figure 5:
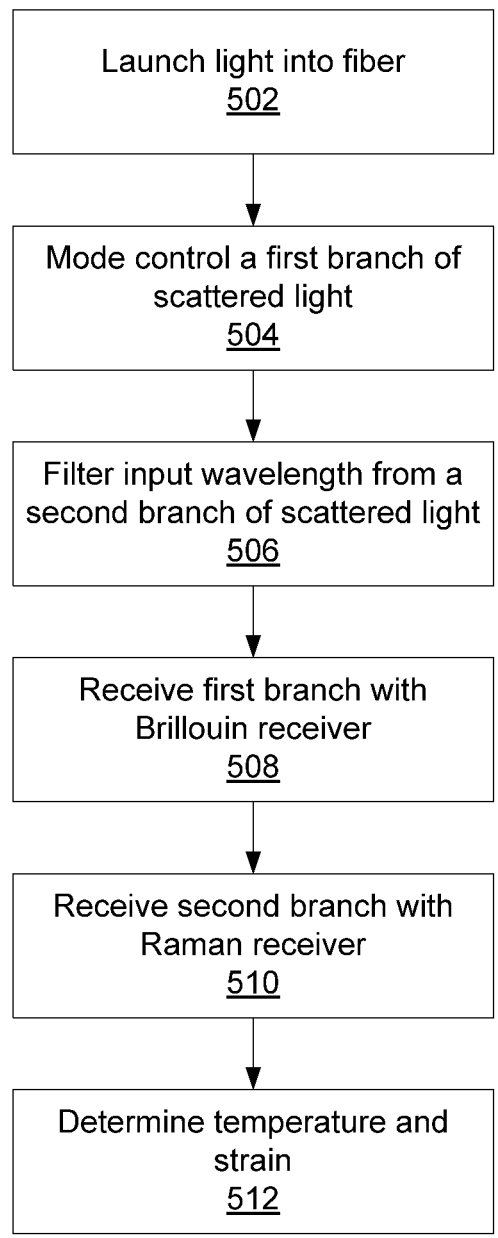
FIG. 5 is a block/flow diagram of a method for hybrid Brillouin/Raman sensing of a fiber in accordance with the present principles.

Referring now to FIG. 5, a method for determining the temperature and strain in a fiber is shown. Block 502 launches a light beam or pulse from a laser into a fiber. The light beam or pulse is scattered in the fiber according to Brillouin and Raman scattering, with the scattered light being split into two beams, either with the double-ended embodiment of FIG. 1 or the single-ended embodiment of FIG. 2. Block 504 mode controls a first branch of the scattered light, while block 506 filters the input wavelength from a second branch of the scattered light. Block 508 receives the first branch of the signal with a Brillouin receiver while block 510 receives the second branch of the signal with a Raman receiver.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
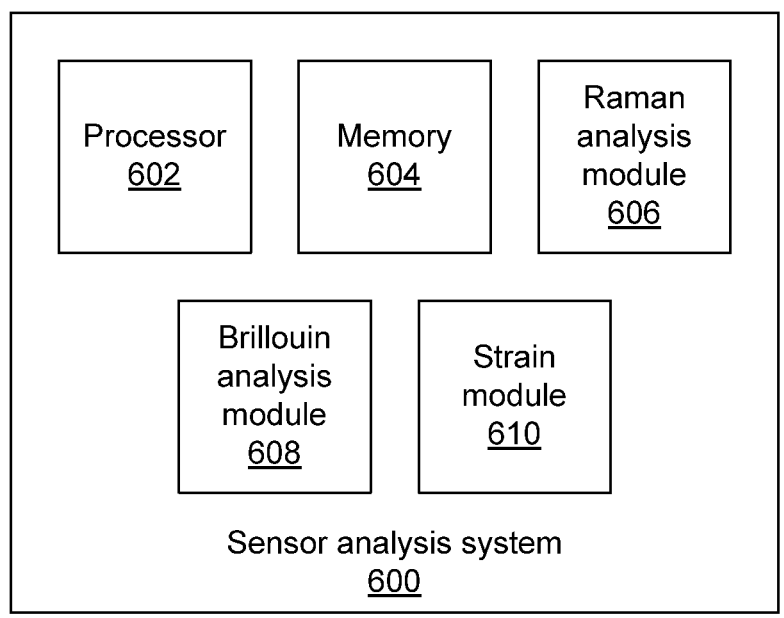
FIG. 6 is a block diagram of a hybrid Brillouin/Raman sensor analysis system in accordance with the present principles.

Referring now to FIG. 6, a sensor analysis system is shown 600. The system 600 includes a hardware processor 602 and memory 604. It should be noted that the system 600 includes several modules which may be implemented as software that is executed on the processor 602 and stored in memory 604. Alternatively, the modules may be implemented as hardware, in one unit or in discrete physical components, in the form of, e.g., an application specific integrated chip or a field programmable gate array. A Raman analysis module 606 determines a temperature profile of the fiber 110/112 while a Brillouin analysis module 608 determines a combined temperature and strain profile of the fiber 110/112. A strain module 610 then determines a strain profile of the fiber 110/112 by removing the temperature contribution of the temperature/strain profile based on the temperature profile generated by the Raman analysis module 606.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A hybrid Brillouin/Raman sensor, comprising:
   a mode converter configured to convert Brillouin backscattered light from a fiber to a spatial mode other than a fundamental spatial mode;
   an optical filter configured to separate Raman forward-scattered light from a fiber to remove unscattered input light;
   a Brillouin receiver configured to coherently detect the Brillouin backscattered light output by the mode converter and to produce a combined temperature/strain profile of the fiber;
   a Raman receiver configured to directly detect the Raman forward-scattered light output by the optical filter and to produce a temperature profile of the fiber; and
   a processor configured to determine a strain profile of the fiber based on the combined temperature/strain profile and the temperature profile.

2. The sensor of claim 1, wherein the Raman receiver comprises:
   a photodiode;
   a trans-impedance amplifier; and
   an analog to digital converter.

3. The sensor of claim 1, wherein the Brillouin receiver comprises:
   a P-I-N photodiode;
   a trans-impedance amplifier;
   an electrical spectrum analyzer configured to produce a Brillouin scattered trace; and
   an analog to digital converter.

4. The sensor of claim 1, further comprising a polarization controller configured to set light input to the fiber to a single polarization.

5. The sensor of claim 1, wherein the mode converter comprises one of the group consisting of a long-period fiber grating, a spatial light modulator, free-space phase plates, and a fused spatial mode coupler.

6. A hybrid Brillouin/Raman sensor, comprising:
   a coupler configured to split backscattered light from a fiber into two paths;
   a mode converter configured to convert backscattered light on a first path to a spatial mode other than a fundamental spatial mode;
   an optical filter configured to separate backscattered light on a second path to remove unscattered input light;
   a Brillouin receiver configured to coherently detect the Brillouin backscattered light output by the mode converter and to produce a combined temperature/strain profile of the fiber;
   a Raman receiver configured to directly detect the Raman forward-scattered light output by the optical filter and to produce a temperature profile of the fiber; and
   a processor configured to determine a strain profile of the fiber based on the combined temperature/strain profile and the temperature profile.

7. The sensor of claim 6, wherein the Raman receiver comprises:
   a photodiode;
   a trans-impedance amplifier; and
   an analog to digital converter.

8. The sensor of claim 6, wherein the Brillouin receiver comprises:
   a P-I-N photodiode;
   a trans-impedance amplifier;
   an electrical spectrum analyzer configured to produce a Brillouin scattered trace; and
   an analog to digital converter.

9. The sensor of claim 6, further comprising a polarization controller configured to set light input to the fiber to a single polarization.

10. The sensor of claim 6, wherein the mode converter comprises one of the group consisting of a long-period fiber grating, a spatial light modulator, free-space phase plates, and a fused spatial mode coupler.

11. A method for sensing conditions in a fiber, comprising:
    launching a light beam into a fiber;
    mode controlling a first branch of scattered light to a spatial mode other than a fundamental spatial mode;
    optically filtering a second branch of scattered light to remove unscattered input light;
    coherently detecting Brillouin scattered light on the first branch to produce a combined temperature/strain profile of the fiber;
    directly detecting Raman scattered light on the second branch to produce a temperature profile of the fiber; and
    determining a strain profile of the fiber, using a processor, based on the combined temperature/strain profile and the temperature profile.

12. The method of claim 11, wherein the first branch comprises light that is Brillouin backscattered from the fiber.

13. The method of claim 12, wherein the second branch comprises light that is Raman forward-scattered from the fiber.

14. The method of claim 12, wherein the second branch comprises light that is Raman backscattered from the fiber.

15. The method of claim 11, further comprising controlling a polarization of the light beam to set the light beam to a single polarization before launching the light beam into the fiber.

16. The method of claim 11, wherein mode controlling the first branch of scattered light comprises passing the first branch of scattered light through a mode converter that comprises one of the group consisting of a long-period fiber grating, a spatial light modulator, free-space phase plates, and a fused spatial mode coupler.

* * * * *